United States Patent
Abe et al.

(10) Patent No.: US 6,331,263 B1
(45) Date of Patent: Dec. 18, 2001

(54) METHOD FOR PRODUCING LAMINATED MOLDINGS

(75) Inventors: Tomokazu Abe; Satoshi Matsumoto; Toshifumi Shimazaki, all of Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/179,762

(22) Filed: Oct. 27, 1998

Related U.S. Application Data

(63) Continuation-in-part of application No. 08/941,471, filed on Sep. 30, 1997, now abandoned, which is a continuation of application No. 08/507,513, filed on Nov. 13, 1995, now abandoned.

(30) Foreign Application Priority Data

Dec. 22, 1993 (JP) .................................................. 5-323843
Apr. 6, 1994 (JP) .................................................. 6-068335

(51) Int. Cl.[7] ............................ B29C 45/56; B29C 45/76
(52) U.S. Cl. ..................... 264/40.5; 264/257; 264/259; 264/266; 264/328.7; 425/149; 425/150
(58) Field of Search ................................... 264/40.5, 257, 264/259, 328.7, 266; 425/150, 149

(56) References Cited

U.S. PATENT DOCUMENTS

| | | | |
|---|---|---|---|
| 3,906,066 | 9/1975 | Barrie | 264/45.5 |
| 4,131,596 | * 12/1978 | Allen | 264/40.5 |
| 4,892,690 | * 1/1990 | Baja | 264/40.1 |
| 4,900,242 | * 2/1990 | Maus et al. | 425/149 |
| 4,917,840 | * 4/1990 | Harada et al. | 264/40.5 |
| 5,008,052 | * 4/1991 | Harada | 264/40.5 |
| 5,034,076 | 7/1991 | Masui et al. | 156/79 |
| 5,053,179 | 10/1991 | Masui et al. | 264/257 |
| 5,162,092 | 11/1992 | Klobucar et al. | 264/513 |
| 5,176,859 | 1/1993 | Leffew | 264/40.5 |
| 5,178,708 | 1/1993 | Hara et al. | 156/242 |
| 5,275,776 | 1/1994 | Hara et al. | 264/257 |
| 5,281,376 | 1/1994 | Hara et al. | 264/46.4 |
| 5,308,570 | 5/1994 | Hara et al. | 264/255 |
| 5,352,397 | 10/1994 | Hara et al. | 264/153 |

(List continued on next page.)

FOREIGN PATENT DOCUMENTS

| | | |
|---|---|---|
| 0 178 901 | 4/1986 | (EP) . |
| 62-149407 | 7/1987 | (JP) . |

OTHER PUBLICATIONS

English Language Abstract for JP 3–19818 dated Jan. 29, 1991 (1 page).

(List continued on next page.)

Primary Examiner—Jan H. Silbaugh
Assistant Examiner—Stefan Staicovici
(74) Attorney, Agent, or Firm—Flynn, Thiel, Boutell & Tanis, P.C.

(57) ABSTRACT

A method of producing a laminated structural molding formed from molded resin and an outer layer of facing material. The method comprises the step of initially placing the facing material in a mold. Molten resin is injected into the mold. The resin is spread throughout the mold by locating mold sections adjacent each other at a set compressive force. The partially assembled molding is then subjected to a cooling process in which the compressive force to which the molding is exposed is reduced so that the force is greater than zero but less than the compressive force used to spread the resin. The mold sections do not retract or move during the reduction in the compressive force. The cooling process is performed just before or after the completion of the spreading of the resin. In this way, the damage to the facing material of the molding is kept to a minimum.

28 Claims, 10 Drawing Sheets

U.S. PATENT DOCUMENTS

| | | | |
|---|---|---|---|
| 5,356,588 | | 10/1994 | Hara et al. .............................. 264/257 |
| 5,395,565 | * | 3/1995 | Nagaoka et al. ..................... 264/40.5 |
| 5,417,899 | * | 5/1995 | Kitamura ............................. 264/40.5 |
| 5,514,311 | * | 5/1996 | Shimizu et al. ..................... 264/40.1 |
| 5,543,094 | | 8/1996 | Hara et al. ........................... 264/46.4 |
| 5,609,801 | * | 3/1997 | Arai ..................................... 264/40.5 |
| 5,756,019 | * | 5/1998 | Nakazawa et al. .................. 264/40.5 |
| 5,766,526 | * | 6/1998 | Watanabe et al. ................... 264/40.5 |
| 5,772,932 | * | 6/1998 | Kamiguchi et al. ................. 264/40.5 |
| 5,785,910 | * | 7/1998 | Sakashita et al. ................... 264/45.5 |
| 5,795,510 | * | 8/1998 | Matsumoto et al. ................ 264/40.5 |
| 5,849,225 | * | 12/1998 | Ebina ................................... 264/40.5 |
| 5,945,047 | * | 8/1999 | Yukihiro et al. .................... 264/40.5 |
| 6,004,490 | * | 12/1999 | Tsai ..................................... 264/40.5 |

OTHER PUBLICATIONS

English Language Abstract for JP 4–338517 dated Nov. 25, 1992 (1 page).

* cited by examiner

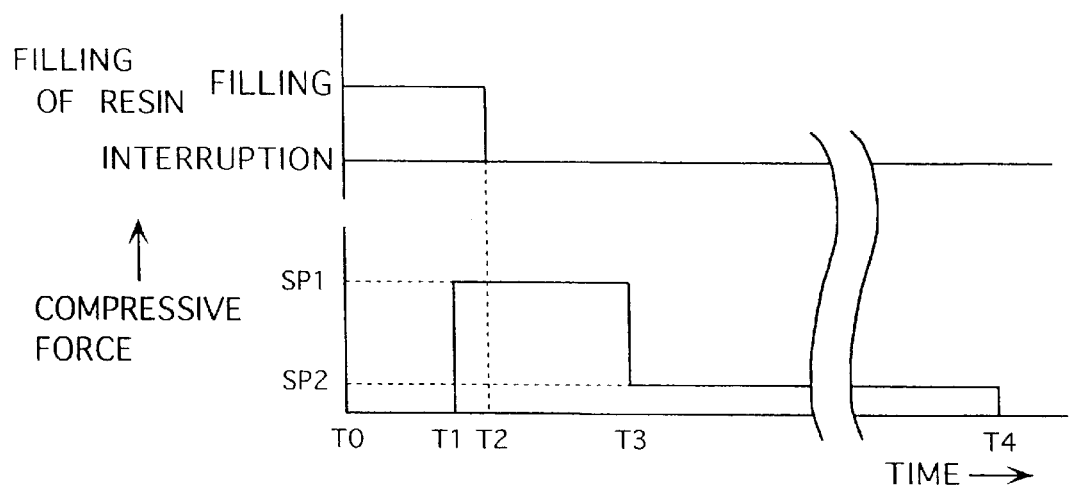
F I G. 1
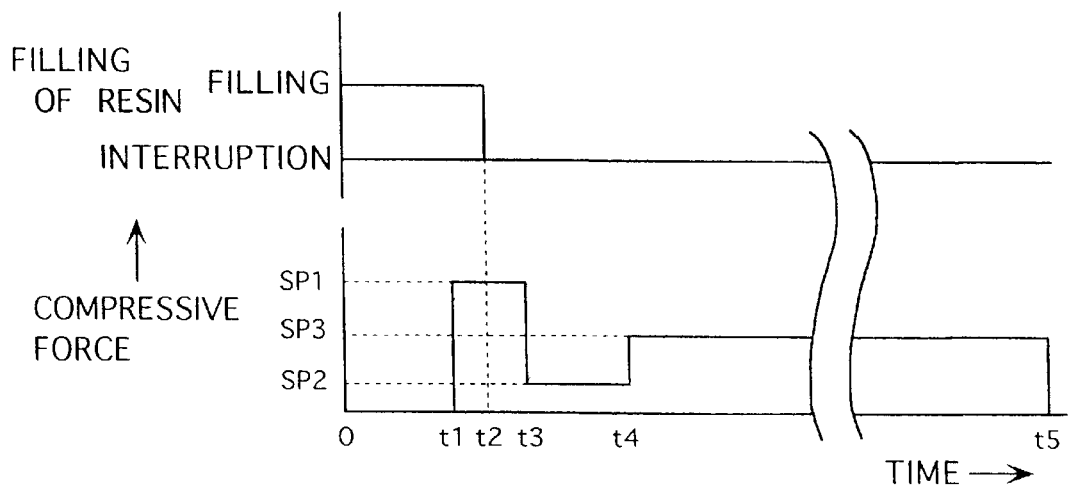
F I G. 2

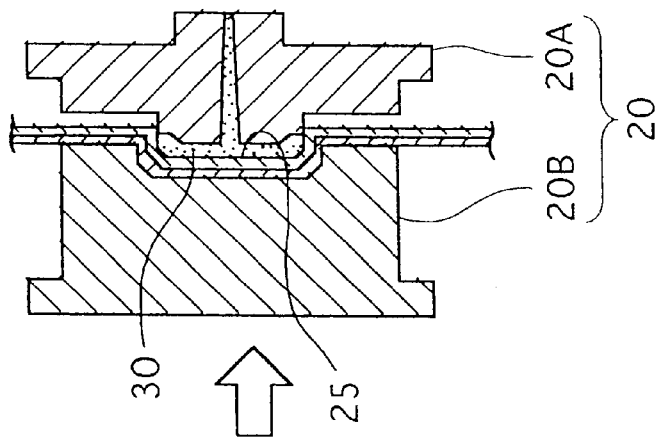
F I G. 4(A)
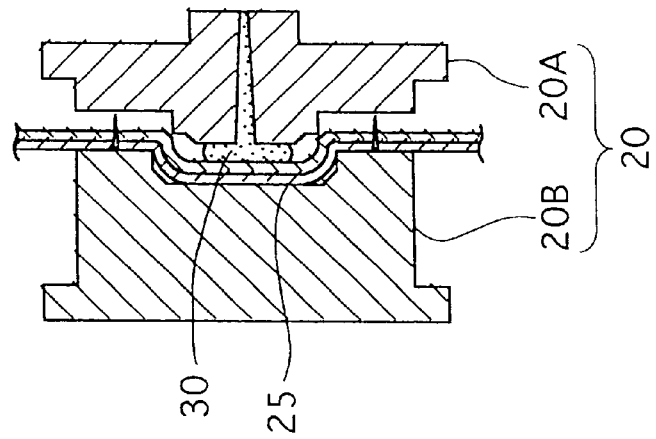
F I G. 4(B)
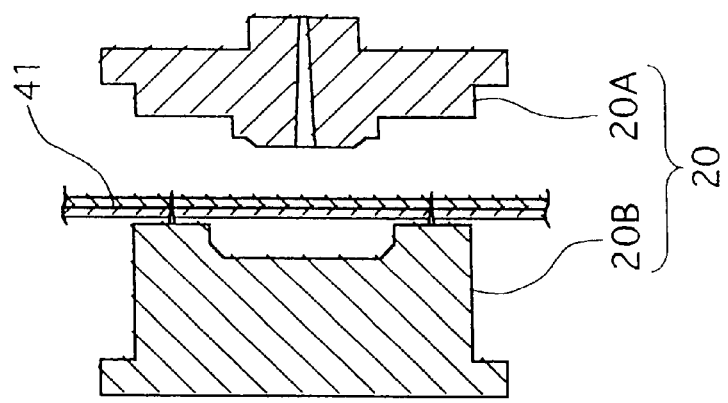
F I G. 4(C)

METHOD FOR PRODUCING LAMINATED MOLDINGS

CROSS REFERENCE TO RELATED APPLICATION

This is a continuation-in-part of our application Ser. No. 08/941,471, filed Sep. 30, 1997, now abandoned, which is a continuation of application Ser. No. 08/507,513, filed Nov. 13, 1995, now abandoned.

BACKGROUND OF THE INVENTION

1. Filed of the Invention

The present invention relates to a method of producing laminated moldings utilized for car interior members and the like and, more particularly, to a method of producing laminated moldings intended to improve tactile feeling, quality of exterior and safety because the facing material is produced in an integrated state.

2. Description of the Related Art

Conventionally, a laminated molding covered with a facing material has been used as a car interior member (e.g., inside of a door and the roof, a seat) and the like. In the conventional laminated moldings, there is room for improvement in the quality of moldings and the facing material of the surface of the moldings.

For example, nice tactile feeling can be obtained and higher quality of exterior surfaces can be advanced by attaching raised cloth, thick cloth or similar material to the surface of the laminated moldings.

Otherwise, attaching thick cloth having cushioning characteristics on the surface, can improve safety for a driver and passengers in an automobile.

One means of producing laminated moldings is integrally molding by injecting resin in a molten state into the cavity in which the facing material is already seated. According to such integrated molding, it was not required to attach the facing material optionally, so that the productivity could be increased.

As recommended molding methods to produce such laminated moldings, there has been known in the art, for example, an injection compression molding method, an injection press molding method, a flow-stamping method or the like.

However, the conventional molding methods were known to involve the following disadvantages.

In the injection molding method depicted in FIG. 16, a clamping operation for the mold is started at a time t1 in order to feed the resin in the melting state toward the mold. A compressive force applied to the mold in the clamping operation is maintained at a predetermined pressure value SP until a time t5 when completing the injection molding. The facing material is compressed by an internal pressure of the resin stored in the mold while maintaining a position between the resin and the mold.

Consequently, when the facing material is sheet material such as raised cloth and the like, the characteristic of the sheet material having naturally nice tactile feeling, high quality and the like can degrade with the bowing and the raising of the sheet material as a result of the flat compression of the thick cloth and the like.

Since the facing material made of the sheet material having the cushioning characteristics melts with compression of the resin at high temperature and high pressure, the unique cushioning characteristics of the facing material are degraded when the laminated material is taken out from the mold.

Even if the compressive force is reduced by smoothing the flow of the resin in molding and thickening the thickness of the laminated moldings in order that the facing material is not compressed, the result is an increase in weight and material cost for the produced laminated moldings.

On the other hand, flow-stamping can reduce the internal pressure of the resin being compressed because the resin is supplied into a mold in a bonding state, so that a maximum flow distance of the resin in the mold becomes short. However, much time is needed for supplying the resin in the bonding state and the appearance of the produced laminated moldings tends to be inferior because the whole facing material solidifies in the compressed state if only a part of the facing material is solidified first as the surface of the resin solidifies by cooling.

The flow-stamping method includes a mechanism to take a nozzle in and out to flow the resin in the bonding state toward the mold, which should be accompanied with an interacting control system and requires a long molding cycle with much time needed for taking the nozzle in and out, so that the cost for producing becomes higher due to the molding apparatus having large-scale structure.

The disadvantages of the foregoing description are not always produced only in the laminated moldings used for the car interior members and the like but also in general laminated moldings covered the surface of the resin with the facing material.

It is an object of the present invention to provide the producing method of the laminated moldings intended to mold integrally the facing material.

SUMMARY OF THE INVENTION

The present invention relates to a method of producing laminated moldings molded from layers of facing material and resin supplied in the molten state to the mold having seated thereon the facing material. The present invention includes the steps of applying the compressive force to the mold to flow the resin until the resin fills up the cavity of the mold and then reducing the compressive force applied to the mold just before or after completing filling of the cavity with the resin.

The laminated moldings can be prepared using the following material, molding apparatus and molding procedures.

The resin, as a basic section of the laminated moldings, can be of thermoplastic resin and the like such as polyethylene, polypropylene, polystyrene, ABS (acrylonitrile-butadiene-styrene), polycarbonate, polyamide and the like. The such resin may be of homopolymer or copolymer, and more preferably, polypropylene or propylene-ethylene-copolymer (which are available to include filler such as talc and mica and a material to be filled into such as glass fiber, carbon fiber, organic fiber and the like).

In the above, a foaming agent need not be added to the resin forming the base of the laminated moldings. Conventionally, the resin base is foamed by adding foaming agent when the facing material is not protected enough and thereby not able to obtain enough cushioning property. The conventional resin base is foamed in order to prevent the molding from being ill-shaped thereby improving shape accuracy. However, since the mold of the present invention is not retracted to decrease the compressive force, the molding is continuously adhered to the mold and does not cause any ill-shape thereof even when the foaming agent is not added. Further, since the mold is not retracted, it is not fitted to employ a foaming agent. Though the facing material of the present invention is protected enough and has good cushioning property, if desired, to obtain more excellent cushioning property and thermal insulation property, or to reduce weight disregarding shortage in strength and rigidity, the base resin containing a foaming agent may be filled into the cavity, the resin having less volume than the final cavity volume for the space to be foamed. However, it is troublesome to determine the amount of the resin accurately, and the manufactured molding is likely to be inferior in the strength and rigidity thereof. Accordingly, it is preferable for the present invention to reduce weight of the moldings and improve thermal insulation ability by selecting the facing material without foaming the base resin.

The facing material is not limited but preferably is a fiber material sheet composed of fiber or a material sheet having cushioning characteristics.

The fiber material sheet includes all kinds of sheets composed of fiber, paper, or cloth, such as woven fabric, non-woven fabric, knitting fabric and the like.

Fiber can be natural fiber, such as plant fiber (cotton, hemp and another), animal fiber (sheep wool, silk and others), mineral fiber (asbestos and others) and the like, chemical fiber such as inorganic fiber (metallic fiber, glass fiber, carbon fiber and others), regenerated fiber, semisynthetic fiber, synthetic fiber (polyethylene, polypropylene, polyacrylonitrile, polyester, polyamide, polyvinyl chloride, polyurethane and others) and the like and mixtures of these natural fibers and chemical fibers.

The preferable fiber material sheet is of a raised sheet or a thick sheet because of the need of nice tactile feeling and a specific characteristic of natural quality, and more preferably, the raised cloth material such as woven fabric, non-woven fabric, knitting fabric and the like.

It is preferable for the above-mentioned fiber material sheet to be bonded to a prevention layer in order to prevent the impregnation of the fiber material by the resin during molding.

For example, non-woven fabric such as polyester, polypropylene and the like can be laminated on a film such as acrylic, polyester and the like as an impregnation prevention layer.

Woven fabric can be manufactured to have a smaller mesh size on the back side contacting the molten resin than the front side to have a different mesh size on the front and back side of the cloth, or to have a coat with synthetic resin and the like on the back side of the fiber material sheet in order to prevent impregnating the front side of the cloth with the melting resin.

It is preferable for the sheet material having the cushioning characteristics to be structured as a multilayer sheet material laminated with a thin face layer and a thick cushion layer having the cushioning characteristics.

The thin face layer can be made from thermoplastic (abbreviated to "TPO") elastomer film such as polyolefin, polystyrene, polyurethane, polyvinyl chloride (abbreviated to "PVC") and the like.

The cushion layer can be made from a foam formed from a synthetic resin such as polypropylene and the like.

The facing material may be made from elastomer-film and the like such as polyolefin, polyurethane, PVC and the like.

The molding apparatus can be selected from an injection compression molding machine or an injection press molding machine capable of controlling the compressive force of the mold over two steps in molding.

It is preferable for the mold to be able to be used in the injection compression molding machine or the injection press molding machine and to have a structure for hanging and holding the facing material thereon.

The following is recommended as the molding procedure.
1) Arrange the facing material onto the mold in the opening state of the mold.
2) In closing the mold, the movable mold section stops moving before its complete close-out state with predetermined intervals, but is provided to maintain the stationary state or not be moved back to open the mold. Therefore, the movable mold section remains stationary until completion of the plasticizing function.
3) Fill up the mold with molten resin using an injection apparatus.
4) Start clamping and applying the compressive force toward the mold just before or after the completion of the filling process, so that the resin is spread out in the mold and the mold is filled by the clamping.
5) Reduce the compressive force applied to the mold after filling up the mold with the resin. The movable mold is not retracted during the reduction of the compressive force.
6) Take out the produced laminated molding from the mold by opening after the resin is cooled and solidified.
7) Start successively a preliminary plasticizing for the next injection molding (next shot) when the injection is completed.

A control method of the compressive force to the mold is preferably a multi-stage control method to change set points in response to respective processes from beginning to end of the injection.

For example, as known from the drawings, respective set points of the compressive force to the mold can be defined by the two steps.

To be accurate, the clamping started at time T1 is operated under the state of defining the compressive force of the clamping apparatus to clamp the mold at the first set point SP1. The compressive force SP1 corresponds to an opposing force generated by the resin being filled into the cavity of the mold and the force injecting the molten resin into the cavity.

The movable mold section is not retracted or moved when the compressive force is reduced at T3. In other words, an opposing force equivalent to the high SP1 is not caused by the molten resin filled in the mold cavity, since the compressive force reduction generally occurs at or after the completion of the resin filling the cavity. The opposing force of the molten resin is equivalent to the compressive force SP2, thereby not causing the position of the movable mold to be retracted or otherwise changed.

As shown in FIG. 1, according to the present invention, the compressive force is reduced after the resin filling of the mold cavity is completed. The compressive force applied to the molten resin in the cavity before completion of resin filling causes deformation and movement of the molten resin, so that the opposing force which opposes compression by the clamping apparatus is low. When the molten resin is almost filled in the mold cavity, the compressive force of the clamping apparatus increases in accordance with the increase in the opposing force caused by the molten resin filling the mold cavity as well as the force injecting the molten resin into the mold cavity. However, the compressive force is reduced when the mold cavity is filled as shown in FIG. 1, so that the compressive force remains equivalent to the opposing force, the opposing force being reduced by the stopping of injection of the molten resin and compression of the facing material. Thus the movable mold is not retracted even when the compressive force is reduced. FIGS. 1 and 2 show the change in force at times T1, T3 and T4 as abrupt changes in compressive force. In other embodiments the changes in compressive force can be gradual or at a predetermined slope, for example when the facing materials have good heat-resistance and are not fluffed (such as PET or PBT), to prevent retraction or movement of the movable mold section.

Time T1 in FIG. 1 is of a time before time T2, representing the completing filling of the resin, but it is possible for time T1 to occur at the same time as T2 or at a time just after time T2 while being in a state where SP1>SP2 in the relative largeness of the set points SP1 and SP2.

As shown in FIG. 2, when the facing material has the cushioning characteristics, the compressive force of the clamping apparatus is preferably defined by the three steps.

To be accurate, the clamping started first at time t1 is operated under the state of defining the compressive force of the clamping apparatus to clamp the mold at the first set point SP1.

At any time after the moment just before completing filling of the resin into the mold, preferably at any time period between the time just before completion of filling of resin and after completion of filling the resin at time T3, the compressive force of the clamping apparatus is reduced to the second set point SP2. The time T3 can be up to about five seconds after completion of resin filling. This is so because the facing material can be compressed so that the force opposing the compressive force does not increase immediately when the cavity is filled with resin.

The movable mold section is not retracted in the above instance. If necessary, the compressive force, shown in FIGS. 1 and 2 and elsewhere in the specification, can be changed as needed, to correspond to changes in the opposing force from the resin filled cavity. Such an arrangement ensures no movement or retraction of the movable mold section as a result of changes in the compressive force.

Next, after dropping the surface temperature in the cushion face material side of the resin at time t4, the set point of the clamping apparatus is increased to the third set point, SP3.

Time t1 in the drawings is at a time before time t2 of complete filling of the resin, but it is possible for time t1 to be at the same time as t2 or at a time just after time t2.

The relative largeness of the compressive force values at the set points SP1, SP2 and SP3 is defined as SP1>SP3>SP2.

According to the present invention, the facing material is subjected to minimal, if any, damage from being compressed by the resin because the compressive force compressing the mold acts as a force to spread the resin in the whole mold before complete filling of the resin in the mold and does not act as a force to compress the facing material.

The damage caused to the facing material is minimized by the small force compressing the facing material and the subsequent reduction in the compressive force to the mold. Even if the compressive force applied to the mold becomes equal to the compressive force applied to the facing material, the facing material remains clamped between the resin and the mold after complete filling of the resin in the mold.

Here, since the surface of the resin is somewhat cooled and solidified in the reducing state of the compressive force, it restrains the melting resin from impregnating the facing material or the facing material from being melted.

Consequently, the specific characteristics of the facing material remain intact because the raising on the fiber material sheet as the facing material is prevented from bowing and the thick fiber material sheet or the sheet material having the cushioning characteristics is prevented from being compressed flat. Thereby the objects of the present invention are achieved.

Further, since the movable mold is not retracted, the mold cavity is kept completely closed thereby improving shaping accuracy of the moldings. Furthermore, the forming process can be further made efficient since the extra movement of the mold is omitted.

The set point of the compressive force in the resin spread process during which the resin fills the mold is defined at a high enough pressure value to be able to spread the resin. Thereafter, the set point in the cooling process is set at a pressure value which does not compress the facing material, but maintains the facing material at a certain degree to compress the resin toward the molding surface of the mold so as to shape the resin into the predetermined configuration. The produced laminated molding is assured of a fine moldability.

The specific characteristics of the fiber material sheet would remain if the impregnated prevention layer provided on the back side of the fiber material sheet is used as the facing material, previous to molding, in order to prevent impregnating of the resin thereinto.

Moreover when the sheet material having the cushioning characteristics is used as the facing material, since compressive force reduced once is increased again before the resin is completely solidified (see FIG. 2), the pressure applied to the resin in the mold is not reduced by the cushioning characteristics of the sheet material. Consequently, the produced laminated moldings can be of fine quality without any damage to the cushioning characteristics of the sheet material.

Further, since no foaming agent is added to the base resin, the cost of the material can be reduced. And since the base resin is not foamed, the strength and rigidity of the moldings can be improved.

BRIEF DESCRIPTION OF THE DRAWINGS

FIG. 1 and FIG. 2 are diagrams of the pressure or compressive force exerted during the clamping operation in accordance with the present invention;

FIGS. 4(A), 4(B) and 4(C) each are enlarged fragmentary sectional views of the first embodiment at various times in the molding procedure;

DETAILED DESCRIPTION OF THE PREFERRED EMBODIMENTS

The embodiments of the present invention will be explained in accordance with the attached drawings.

Figure 3:
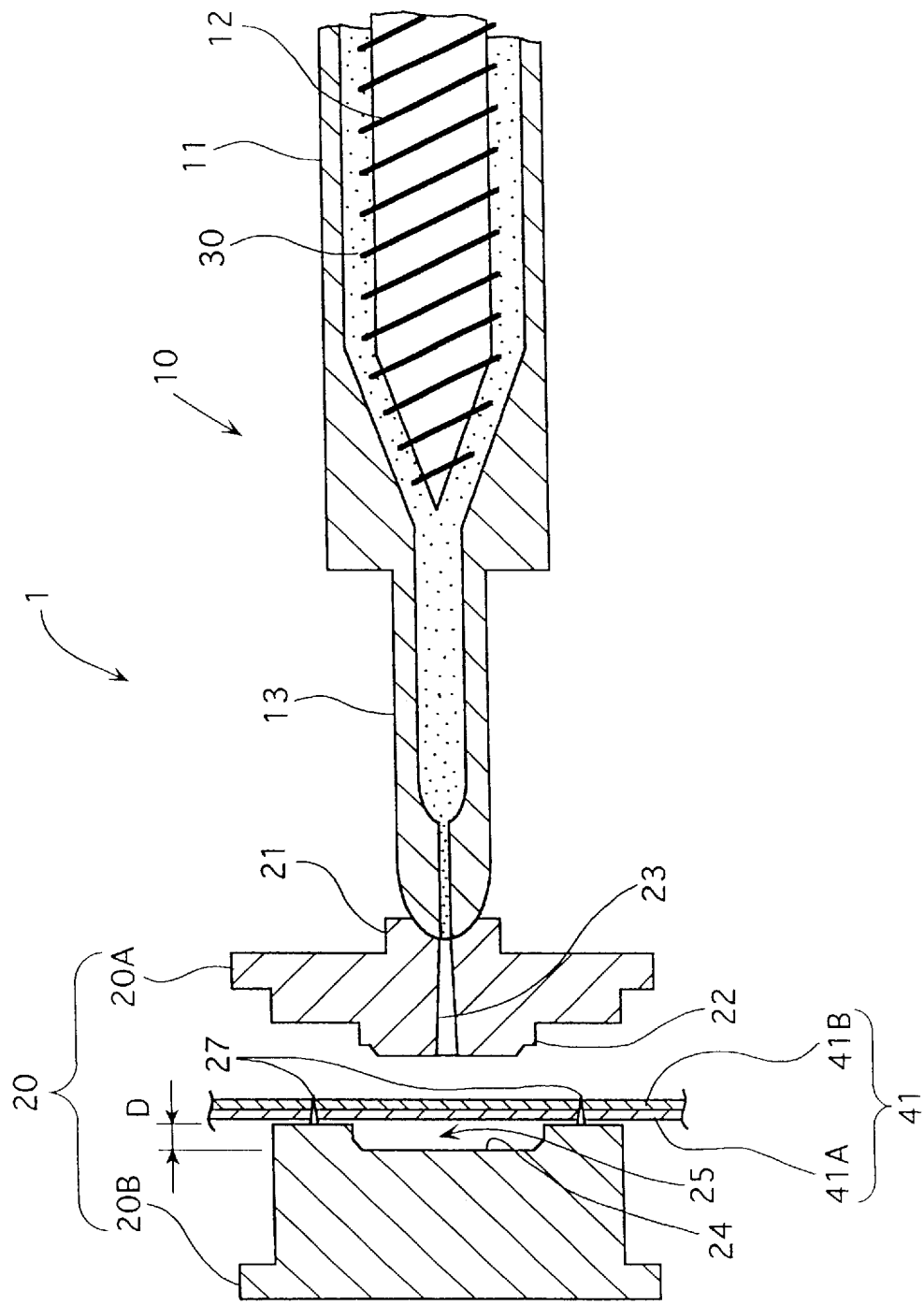
FIG. 3 is a fragmentary sectional view of the first embodiment of the injection compression molding machine in accordance with the present invention.

FIG. 3 illustrates fragmentarily an injection compression molding machine 1 of the present embodiment which includes an injection apparatus 10 injecting synthetic resin, a mold 20 for molding and a clamping apparatus (not shown).

The injection apparatus 10 consists of a screw 12 to knead a synthetic molten-state resin 30 inside of a cylindrical barrel 11. At a forward end of the cylindrical barrel 11, there is provided a nozzle 13.

The injection apparatus 10 is adapted to connect the nozzle 13 to a boss 21 of the mold 20 to allow injection of the resin 30 through the nozzle 13.

The mold 20 is provided to be split into a secured mold section 20A on the right and a movable mold section 20B on the left in FIG. 3.

The secured mold section 20A is of a male mold having a molding surface 22 projecting therefrom and of a mold half-member securely attached to the injection compression molding machine 1. In addition to providing the above-mentioned boss 21 in the secured mold section 20A, a sprue 23 leading the melting resin 30 into the mold 20 penetrates a central portion of the secured mold section 20A.

The movable mold section 20B is of a female mold including therein a cavity 25 shaped with a recessed molding surface 24 to mold the resin 30 and intervening facing material at a movable mold half-member with reference to the injection compression molding machine 1. Incidentally, the depth D of the cavity 25 should be determined by the thickness of the molding produced by the mold 20.

It should be understood that the clamping apparatus (not shown) is placed on the left of the movable mold section 20B of the mold 20 in FIG. 3.

The clamping apparatus is such that the movable mold section 20B is shifted toward the secured mold section 20A so as to clamp the mold 20, a compressive force of which in operation is successively controllable within a range of 0–100%. The drive of the clamping apparatus causes the resin 30 filled in the cavity 25 to spread and to apply internal pressure after completing the spreading operation. Incidentally, no foaming agent is added to the molten resin 30.

The internal pressure effecting on the resin 30 is of a necessary pressure against the molding surfaces 22 and 24 to maintain a predetermined shape of the resin 30 and to obtain a fine molded shape.

On the right side of the movable mold section 20B in FIG. 3, attachment members 27 are planted to arrange and hold a facing material 41 covering a surface of laminated moldings as will be described later.

The facing material 41 is composed of a fiber material sheet 41A made from raised cloth or the like, for example woven fabric, non-woven fabric, knitting fabric or the like, and of impregnation prevention layer 41B made from non-woven fabric, film or the like and laminated on the fiber material sheet 41A from the resin filling direction (the right surface of the sheet 41A in FIG. 3). The impregnation prevention layer 41B is provided in order to prevent the impregnation of the fiber material sheet 41A with the melting resin 30 in molding.

The attachment members 27 are of upstanding pins fixed at predetermined intervals around the edge of the cavity 25, thereby passing through the facing material 41 to arrange and hold the movable mold section 20B adjacent the secured mold section 20A.

In the present embodiment, the laminated moldings 40 is molded by a following injection compression molding method.

First the mold 20 is opened as illustrated in FIG. 4(A) and closed after setting the facing material 41 onto the movable mold section 20B.

The movable mold section 20B stops moving before its complete close-out state with predetermined intervals (e.g., about 5–15 mm), but is provided to keep the stationary state or not to be moved back to open the mold.

Next, the injection apparatus is driven to start a filling process in which the inner cavity 25 of the mold 20 is filled with the melting resin 30 via the facing material as illustrated in FIG. 4(B).

Just before or after the completion of the filling process, the clamping apparatus is driven to clamp the mold 20 by applying the compressive force, so that a resin spread process through which the melting resin 30 is spread out in the cavity is carried out.

As shown in FIG. 4(C), the fulfilling process is completed when the melting resin 30 spreads into every corner of the cavity 25 of the mold 20. At any time after the moment just before complete filling of the resin in the mold, preferably at any time between the time just before completion of filling the resin and immediately after completion of filling the resin at time T3, a cooling process is started in which the compressive force applied to the mold 20 is reduced in order that the facing material 41 is not too compressed. At this point, the movable mold section 20B is not retracted backward. The melted resin 30 throughout the cooling process is cooled and solidified under the preferable lower compressive force to hold the predetermined shape of the melting resin 30.

When the resin 30 completes the cooling and solidifying process, the laminated molding is taken out from the mold 20 in its opening state.

Figure 5:
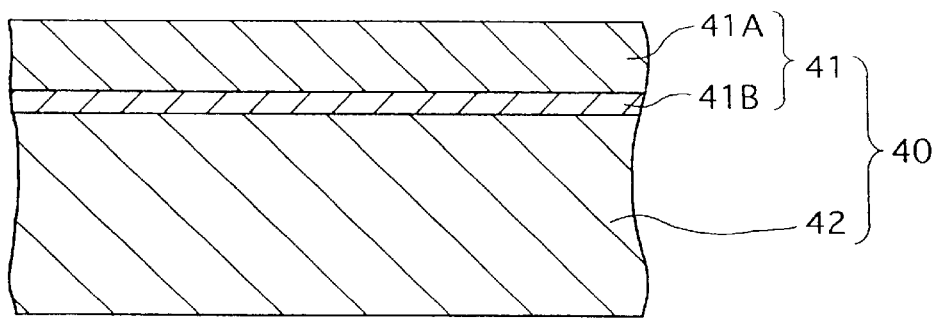
FIG. 5 is a sectional view of the laminated molding in the first embodiment.

FIG. 5 illustrates a sectional view of the laminated molding 40 produced as in the forgoing explanations.

The laminated molding 40, as shown in FIG. 5, consists of the facing material 41 having the fiber material sheet 41A and the impregnation prevention layer 41B and a base section 42 formed by the cooling and solidification of the resin 30.

Upon completion of the injection process, a plasticization process for plasticizing a newly supplied resin 30 will be naturally started for next injection molding (next shot).

According to the foregoing description, the compressive force in the resin spread process and the cooling process of the clamping apparatus is previously defined before carrying out the injection compression molding. Set points in above-mentioned respective processes are assigned as set points SP1 and SP2 which are determined as following.

In particular, the set point SP1 in the resin spread process is defined at a high enough pressure or compressive force value to be able to spread the resin 30.

The set point SP2 in the cooling process should be controlled at a pressure or compressive force value which does not compress the facing material 41, but the force should be maintained at a certain degree to compress the resin 30 along the molding surfaces 22, 24 so as to shape the resin into the predetermined configuration.

Following effects are mentioned in accordance with the present embodiment.

Since the compressive force applied to the mold 20 by the clamping apparatus is reduced just after completing the resin spread process filling the inner mold 20 with the molten resin 30, any damage (functional deprivation or depression) of the fiber material sheet 41 will not appear. In other words, the raised fiber material sheet 41 is prevented from being compressed a significant amount for a significant length of time.

Consequently, the fiber material sheet 41A retains a specific characteristic of natural quality, nice tactile feeling and the like so as to obtain the laminated moldings 40 having a surface with a requiring state.

The set point SP1 of the compressive force in the resin spread process is defined at an enough high pressure value so as to spread the melting resin 30. The set point SP2 in the cooling process should be controlled at a pressure value which does not compress the facing material 41, but maintains a certain degree of compression of the resin 30 between the molding surfaces 22 and 24 so as to shape the resin into the predetermined configuration, so as to ensure the formation of a quality molded product. For example, the set point SP2 can be between 12% and 33% of the first force SP1.

Further, since the reduction of compressive force is carried out without retracting the mold, inferiority of goods such as ill-shapes can be prevented thereby improving the efficiency and quality of the molding process.

It will be possible to have lighter weight for the laminated moldings 40 and a lower cost of material because of a thinner base section 42 resulting from the clamping operation being carried out at the set point SP1 capable of spreading the resin 30. Since a flowing balance of the molten resin 30 in molding is not upset, the conditions of molding can be naturally defined.

Integral molds of the laminated moldings 40 will enable the productivity of the laminated molding 40 to advance because an attaching operation between the fiber material sheet 41A and the base section 42 may be omitted.

Since no foaming agent is added to the base resin, the cost of the material can be reduced and the strength of the moldings can be improved.

The characteristics of the fiber material sheet 41A, regardless of its type, are maintained because the facing material 41 includes the impregnated prevention layer 41B in order to prevent the fiber material sheet 41A from being impregnated by the resin 30 in molding even if the fiber material sheet 41A is of a large-meshed woven fabric which the molten resin 30 can impregnate easily thereinto.

Now, the effectiveness of the present invention will be explained in accordance with experimental examples.

EXPERIMENTAL EXAMPLE 1

Figure 6:
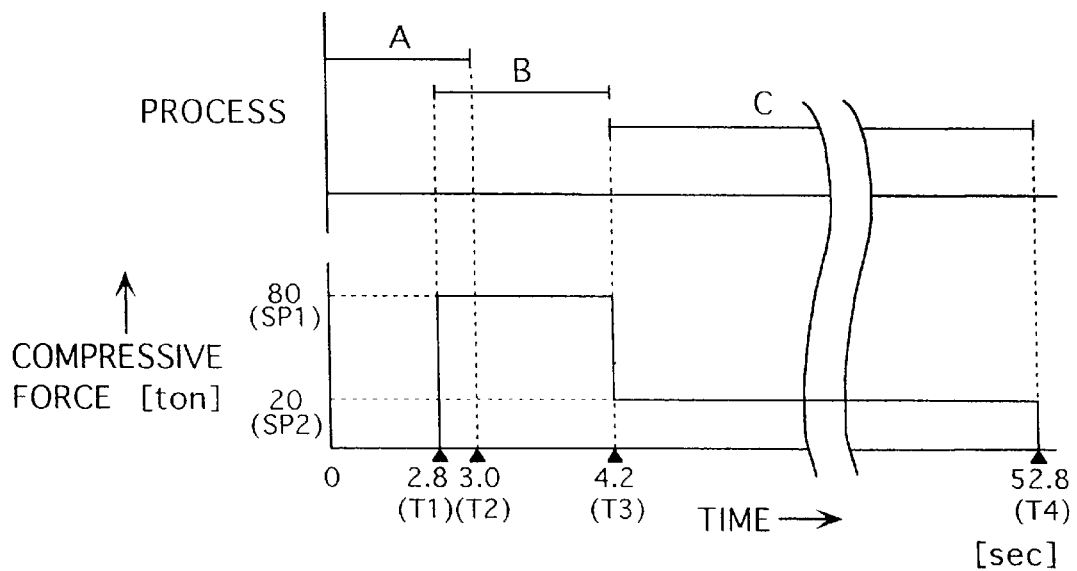
FIG. 6 is a diagram of the pressure or compressive force exerted during experimental example 1 of the clamping operation in accordance with the present invention.

The experimental example 1 is conducted to evaluate laminated moldings when produced under the producing method in accordance with the present invention. As shown in FIG. 6, the present experimental example 1 is carried out in the order of the filling process A, the resin spread process B and the cooling process C.

Following are timings of starting and completing respective processes A–C and the set points of the compressive force through respective processes B and C.

The timings of respective processes A–C will be indicated with time (seconds) from when starting the filling process A and the set points of the compressive force will be indicated with clamping force (ton) of the clamping apparatus.

| | |
|---|---|
| Starting time T1 of the resin spread process B | 2.8 seconds |
| Completing time T2 of the filling process A | 3.0 seconds |
| Completing time T3 of the resin spread process B | 4.2 seconds |
| Completing time T4 of the cooling process C | 52.8 seconds |
| Set point SP1 of the compressive force in the resin spread process B | 80 tons |
| Set point SP2 of the compressive force in the cooling process C | 20 tons |

Thus in Experimental Example 1, the compressive force established during the cooling process is about 25% of the compressive force established during the resin spread process.

COMPARATIVE EXAMPLE 1

In order to ascertain the value of the present invention, the comparative example 1 has been conducted by means of well-known conventional technology so as to obtain the same laminated moldings 40 as in the afore-described experimental example 1.

Figure 7:
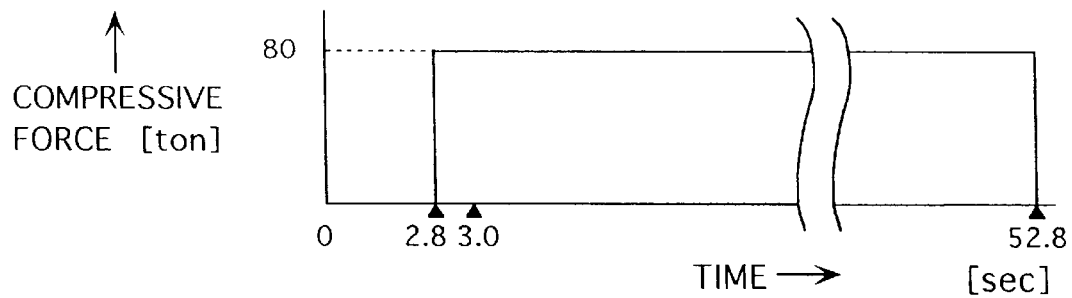
FIG. 7 is a diagram of the pressure exerted during comparative example 1 by the clamping operation in accordance with the conventional, prior art technology.

In the present comparative example 1 as shown in FIG. 7, the mold 20 is compressed with the same compressive force of 80 tons as in the resin spread process B in the above-mentioned experimental example 1 after from a time 2.8 seconds from starting filling of the resin 30 until the completion of the molding operation. This means that a compressive force of no less than 80 tons will be maintained after the completing time T3 of the resin spread process B.

COMMON INJECTION CONDITION

Both of the experimental example 1 and the comparative example 1 should be understood to employ common material, apparatus and molding conditions, which are as follows:

(1) MATERIAL

As the resin 30 utilized in the base section 42 of the lamination moldings 40, polypropylene (by IDEMITSU PETROCHEMICAL CO.,LTD., a brand name: IDEMITSU Polypro J-5050H, MI 55 g/10 min.: 230 C., 2.16 kgf) is employed. More importantly, the molten resin 30 contains no foaming agent therein.

The facing material 41 preferably is prepared in a laminated state consisting of the fiber material sheet 41A having a thickness of 2.0 mm and made from the non-woven fabric of polyester and the impregnated prevention layer 41B having a thickness of 0.1 mm and made from the non-woven fabric of polyester.

(2) MOLDING APPARATUS

Regarding to the molding apparatus, an injection compression molding machine (Screw diameter; 70 mm, Clamping force; 450 ton by MITSUBISHI JUKOGYO KABUSHIKI KAISHA) being of a general horizontal injection molding machine accompanied with an injection compression molding system is employed. The injection compression molding machine can control successively the compressive force within a range of 0%–100%.

(3) MOLD

The mold 20 includes the cavity 25 in order to shape a seat back (500×600 mm, thickness 3 mm) in a car and a direct gate provided at the center of the cavity. A parting portion shape is made by a so called inrow system to prevent from raising burr. The depth D of the cavity see FIG. 3) should be 60 mm.

| (4) MOLDING CONDITION | |
|---|---|
| 1) Molding temperature | 200 C. |
| 2) Mold temperature | 40 C. |
| 3) Injection pressure of resin | 90 kg/cm$^2$ (gauge pressure) |
| 4) Compressive degree of the mold (amount of opening mold) | 10 mm |
| 5) Compressive speed of the mold | 4 mm/sec. |

RESULT OF EXPERIMENTAL AND COMPARATIVE EXAMPLES

The laminated moldings by the experimental example 1 resulted in the thickness of the facing material 41 measuring about 1.7 mm and about 1.8 mm in accordance with distances of about 50 mm and about 250 mm from the gate.

On the other hand, the laminated moldings by the comparative example 1 resulted in the thickness of the facing material 41 measuring about 0.5 mm and about 0.6 mm at distances of about 50 mm and about 250 mm, respectively, from the gate or sprue.

According to the results of the above-mentioned experimental and comparative examples, the effects of the present invention were evidenced by the fiber material sheet 41A in the experimental example 1 maintaining its raising state with very little compression. However, the fiber material sheet 41A in the comparative example 1 had a bowing state and received damage for respective functions from being almost completely compressed.

It should be understood that the present invention is not intended to be limited to the above-described embodiment, and various changes may be made therein without departing from the spirit of the present invention. For example, the following changes will be also included in the scope of the present invention.

The resin 30 resulting in the base section 42 of the laminated moldings 40 may be of a resin material suitable for molding with the mold, that is thermoplastic resin or the like which is composed of copolymer or homopolymer such as polyethylene, polypropylene, polystyrene, ABS (acrylonitrile-butadiene-styrene), polycarbonate, polyamide, etc., and more preferably, polypropylene, propylene-ethylene copolymer (which are available to include filler such as talc and mica and a material to be filled thereinto, such as glass fiber, carbon fiber, organic fiber and the like).

The fiber material sheet 41A, which is defined as raising cloth such as woven fabric, non-woven fabric, knitting fabric or the like in the above-mentioned embodiment, may be made of thick cloth such as woven fabric, non-woven fabric, knitting fabric or the like, or of paper or the like, in brief, the fiber material sheet 41A may be of a sheet woven from fiber.

Fiber can be of a natural fiber such as natural fiber (cotton, hemp and others), animal fiber (sheep wool, silk and others), mineral fiber (asbestos and others) and the like, chemical fiber such as inorganic fiber (metallic fiber, glass fiber, carbon fiber and others), regenerated fiber, semisynthetic fiber, synthetic fiber (polyethylene, polypropylene, polyacrylonitrile, polyester, polyamide, polyvinyl chloride, polyurethane and others) and the like and a mixture of these natural fibers and chemical fibers.

The impregnated prevention layer 41B forming the facing material 41 in the above-mentioned embodiment may be omitted if the resin 30 is not likely to impregnate into the fiber material sheet 41A or if the impregnation effect is minimal.

Incidentally, though no foaming agent is added to the molten resin 30 in the aforesaid embodiment, foaming agent may be added in accordance with the other conditions such as the material of the base, facing material etc. However, since the movable mold section 20B is not retracted during reduction of the compressive force, the mold accepts no volume increase from the foaming agent unless the cavity volume or the resin volume is controlled beforehand, such that expansion of the resin by the foaming agent can be obtained.

The resin 30 is spread and compressed by the injection compression molding machine 1 in the above-mentioned embodiment, however, the use of the injection compression molding machine 1 is not intended to be limited, and it is possible to use a molding machine which can spread the molten resin by clamping the mold, that is an injection press molding machine and the like.

The laminated molding 40 should not be considered as being limitedly applied to car interior members as mentioned above but also as a casing for electric appliances, an exterior decoration of furniture and the like.

The molding conditions such as the set point of compressive force, the respective starting time for the process and so on should not be considered limited as in the above explained experimental example 1, but it will be acceptable to determine them as occasion may demand in response to size of the produced laminated moldings 40 and the kind of resin to be used.

Furthermore, the mold can be of a multipoint gate type mold having plural gates or sprues instead of the mold having one gate or sprue as has been mentioned in this embodiment.

SECOND EMBODIMENT

Figure 8:
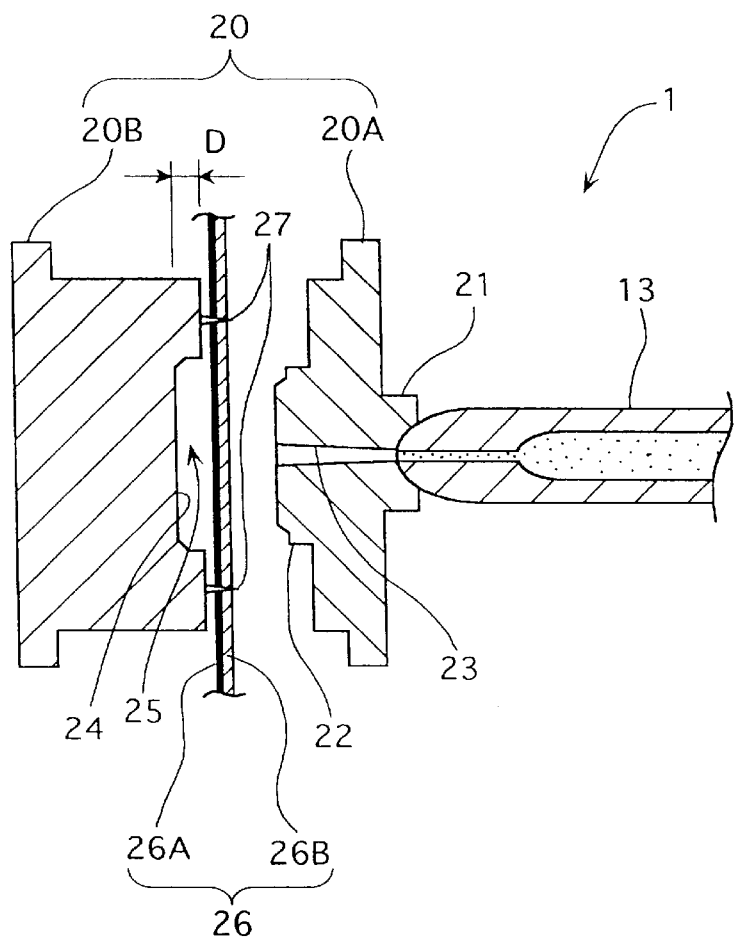
FIG. 8 is a fragmentary sectional view of a second embodiment of the injection compression molding machine in accordance with the present invention.

FIG. 8 illustrates fragmentarily the injection compression molding machine 1 in accordance with the second embodiment in the present invention, wherein the facing material 41 in the first embodiment is replaced with a cushion face material 26 having the cushioning characteristics as a facing material.

Explanation of the injection compression molding machine 1 and the mold 20 in the following second embodiment will be omitted because of being the same as in the first embodiment.

Referring to the drawing, the cushion face material 26 is of a sheet integrated a face layer 26A made from PVC or TPO with a cushion layer 26B made from foam such as polypropylene and the like.

In the present embodiment, an injection compression molding is carried out by a following method.

Figure 9A:
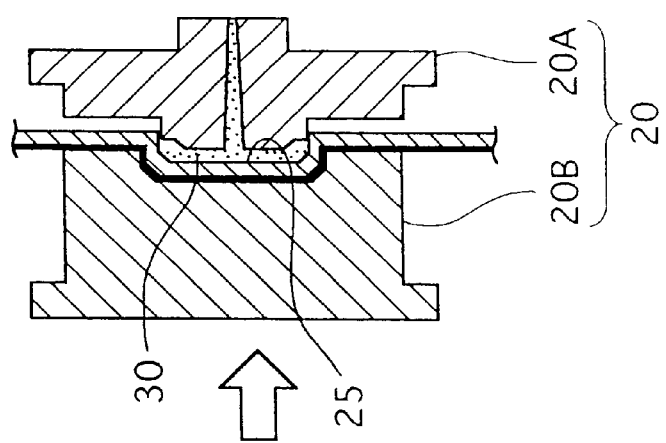
FIGS. 9(A), 9(B) and 9(C) each are enlarged fragmentary sectional views of the second embodiment at various times during the molding procedure.

First the mold 20 is opened and then closed after setting the cushion face material 26 onto the movable mold section 20B as illustrated in FIG. 9(A).

The movable mold section 20B stops moving before its complete close-out state with predetermined intervals (e.g., about 5–100 mm), but it is provided to keep the stationary state or not to be moved back to open the mold.

Figure 9B:
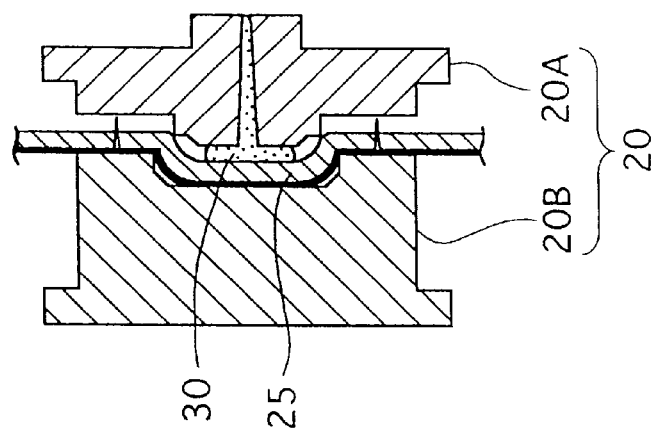

Next, the injection apparatus is driven to start the filling process at which the inner cavity 25 of the mold 20 is filled with resin 30 as shown in FIG. 9(B).

Just before or after completing the filling process, the clamping apparatus is driven to apply the compressive force to clamp the mold 20 so that the resin is spread out throughout the cavity 25 until being filled up.

Figure 9C:
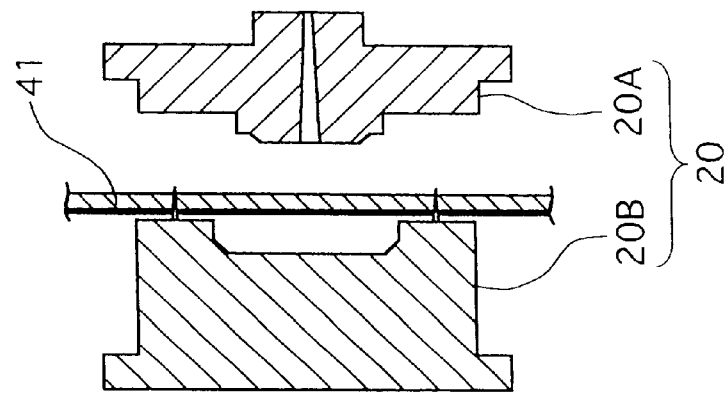

The resin spread process is completed when the melting resin 30 is spread into every corner of the cavity 25 of the mold 20 as shown in FIG. 9(C). At any time after the moment just before complete filling of the resin in the mold, preferably at any time between the time just before completion of filling the resin in the mold and immediately after completion of filling the resin at time T3, up to five seconds after filling of the cavity, the cooling process will be started.

The cooling process is performed in order to ensure that the molten resin 30 in the mold 20 is cooled and solidified in the pressurized state by applying the predetermined compressive force to the mold 20 and involves, as its initial step, a protect process which reduces the compressive force applied to the mold 20 so as to prevent compression of the cushion face material 26 by the molten resin 30 having high pressure and high temperature.

The protect process should be understood to cool and solidify the molten resin 30 while reducing relatively the compressive force applied to the mold 20. The protect process continues until the surface of the resin 30 is cooled such that the cushion face material 26 is not remarkably melted.

According to the protect process, the cushion face material 26 can be averted from any damage. This is because the high temperature of the molten resin 30 does not cause remarkable damage on the cushion face material 26 because of the lower compressive force applied later to the mold 20. And even when the compressive force applied to the mold 20 rises in the next main cooling process, the cushion face material 26 does not receive any damage because the surface of the resin 30 is already significantly cooled.

With cooling the surface of the molten resin 30, the above-mentioned protect process completes, and simultaneously the compressive force is risen for the last cooling process in succession. The molten resin 30 throughout the cooling process is cooled and solidified under the preferable compressive force to maintain the predetermined shape of the resin 30.

When the resin 30 completes the cooling and solidifying processes, the laminated molding is taken out from the mold 20 in the opening state. In completion of the injection process, a plasticization process for plasticizing newly supplied molten resin 30 will be naturally started for the next injection molding.

In the foregoing description, the compressive force in the resin spread process and the cooling process (including the protect process) of the clamping apparatus is previously defined before carrying out the injection compression molding. Set points in above-mentioned respective processes are assigned as set points SP1 to SP3 which are determined as following.

In particular, the set point SP1 in the resin spread process is defined at a high enough pressure value to be able to spread the resin 30.

The set point SP2 for the protect process in the cooling process should be controlled at a pressure value which does not compress the cushion face material 26.

The set point SP3 after completing the protect process in the cooling process should be controlled at a certain pressure value to compress the resin 30 toward the molding surface 22, 24 so as to shape the resin into the predetermined configuration.

The comparative forces of respective set points SP1, SP2 and SP3 are SP1>SP3>SP2. The compressive force at the set point SP2 can be between 12% and 33% of the first compressive force SP1. The set point SP3 for the third compressive force can be from 60% to 67% of the set point SP1 of the first compressive force.

The following effects can be obtained in accordance with the present embodiment.

The final laminated moldings can be prevented from the deprivation of the cushioning characteristics because the high compressive force is applied to the mold 20 in order to flow the molten resin 30 in the resin spread process throughout which the cushion face material does not receive any damage and the protect process is controlled to reduce the above-mentioned compressive force in the initial cooling process after completing the resin spread process so as to prevent the cushion face material 26 from any damage.

As described, in the protect process, the surface of the resin 30 is cooled so it does not melt the cushion face material 26 excessively and the compressive force in the mold 20 is increased in the successive cooling process to maintain the predetermined shape of the resin 30 filled into the mold 20, whereby the formability of the final laminated moldings can be in the fine state.

Consequently, the high quality laminated moldings can be produced by maintaining the fine state with regard to the formability and the cushioning characteristics.

Now, the effects of the present invention will be confirmed in accordance with concrete experimental examples.

EXPERIMENTAL EXAMPLE 2

Figure 10:
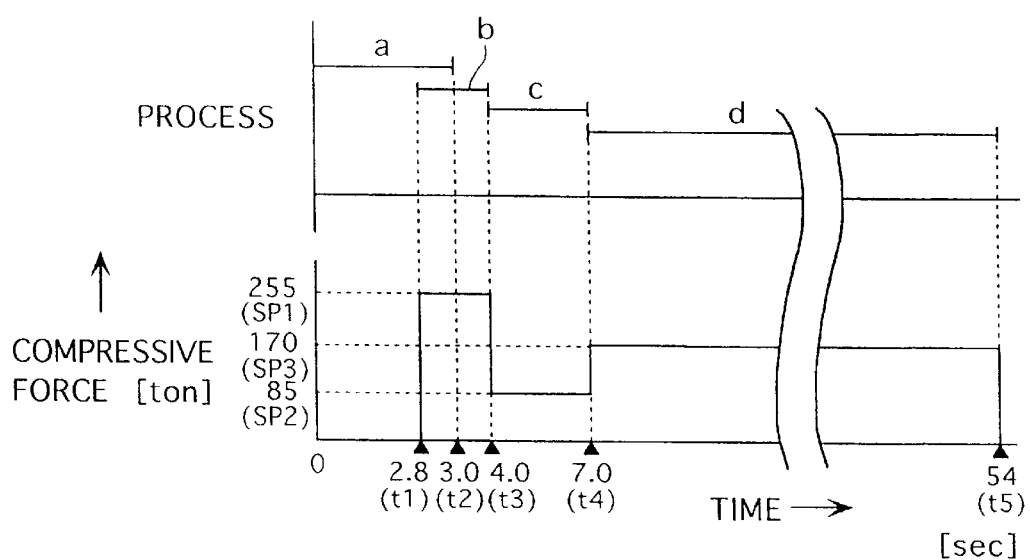
FIG. 10 is a diagram of the pressure or compressive force exerted during experimental example 2 of the clamping operation in accordance with the present invention.

The experimental example 2 is conducted to evaluate laminated moldings when produced under the producing method of the laminated moldings in accordance with the present invention. As shown in FIG. 10, the experimental example 2 is carried out in order of the filling process a, the resin spread process b, the protect process c and the cooling process d. The cooling process d does not only mean the comprehensive cooling process to cool and solidify the resin but also means the later half of the cooling process excluding the protect process determined in the initial cooling process.

Following are timings of starting and completing respective processes a–d and the set points of the compressive force through respective processes b–d.

The timings of respective processes a–d will be indicated with time (seconds) from when starting the filling process and the set points of the compressive force will be indicated with clamping force (tons) of the clamping apparatus.

| | |
|---|---|
| Starting time t1 of the resin spread process b | 2.8 seconds |
| Completing time t2 of the filling process a | 3.0 seconds |
| Starting (completing the resin spread process b) time t3 of the protect process c | 4.0 seconds |
| Starting (completing the protect process c) time t4 of the cooling process d | 7.0 seconds |
| Completing time t5 of the cooling process d | 54.0 seconds |
| Set point SP1 of the compressive force in the fulfilling process b | 255 tons (30%) |
| Set point SP2 of the compressive force in the protect process c | 85 tons (10%) |
| Set point SP3 of the compressive force in the cooling process d | 170 tons (20%) |

Thus the compressive force established during the first stage of the cooling process is 33% of the compressive force established during the resin spread process. The force established during the second stage of the cooling process is 66% of the force established during the resin spread process.

COMPARATIVE EXAMPLE 2

In order to ascertain the value of the present invention, a comparative example 2 has been conducted by means of the well-known conventional technology so as to obtain the same laminated moldings as in the afore-described experimental example 2.

Figure 11:
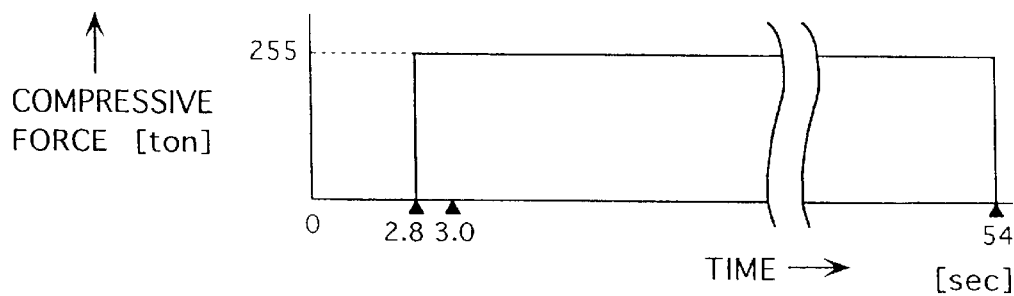
FIG. 11 is a diagram of the pressure exerted during comparative example 2 by the clamping operation in accordance with the conventional prior art technology.

The comparative example 2 is, as described in FIG. 11, to compress the mold with the same compressive force by 255 tons as in the resin spread process b of the afore-mentioned experimental example 2 after 2.8 seconds from the filling start of the resin. The compressive force applied is maintained until completing the mold.

COMMON INJECTION CONDITION

Both of the experimental example 2 and the comparative example 2 should be understood to be restrained to common material, apparatus and molding conditions, which are as follows:

(1) MATERIAL

As the resin utilized in the base section of the laminated moldings, polypropylene (by IDEMITSU PETROCHEMICAL CO., LTD., a brand name : IDEMITSU Polypro J-5050H, MI 55 g/10 min. : 230 C, 2.16 kgf) is employed.

The cushion face material is prepared in a single integrated sheet material having the final thickness of 3.6 mm with the face layer having the thickness of 0.6 mm and made from PVC and the cushion layer having the thickness of 3.0 mm and made from polypropylene foamed to a fifteen-fold volume.

(2) MOLDING APPARATUS

The molding apparatus includes an injection compression molding machine (Screw diameter; 105 mm, Clamping force 850 tons, MITSUBISHI JUKOGYO KABUSHIKI KAISHA) being of a general horizontal injection molding machine accompanied by an injection compression molding system. The injection compression molding machine can control successively the compressive force within a range of 0–100%.

(3) MOLD

The mold is designed to have a disc-shaped cavity having the diameter of 800 mm and a direct gate provided at the center of the cavity. A parting portion shape is made by a so called inrow system to prevent raising of a burr. The depth D of the cavity (see FIG. 8) should be 0 mm.

| | |
|---|---|
| (4) MOLDING CONDITION | |
| 1) Molding temperature | 180 C. |
| 2) Mold temperature | 40 C |
| 3) Injection pressure of resin | 90 kg/cm$^2$ (gauge pressure) |
| 4) Compressive degree of the mold | 30 mm |
| 5) Compressive speed of the mold | 10 mm/sec. |

RESULT OF EXPERIMENTAL AND COMPARATIVE EXAMPLES

Figure 12:
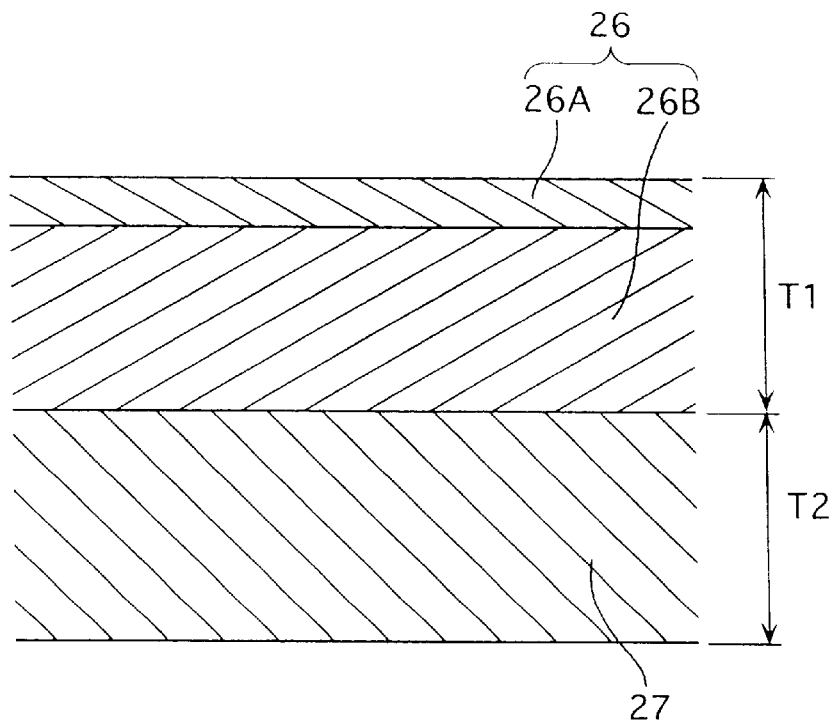
FIG. 12 is a sectional view in the experimental example 2 of the laminated molding.

As can be observed from FIG. 12, the laminated moldings by the experimental example 2 resulted in much the same thickness for the thickness T1 of the cushion face material 26 and the thickness T2 of the base section 27 made from polypropylene. To be accurate, the thickness T1 was 2.2 mm and the thickness T2 of the base section 27 was 2.1 mm when measuring respectively at a distance of 300 mm from the gate.

Comparing with the thickness of the cushion face material 26 before being carried out the experimental example 1, the cushion face material 26 after completing the above-mentioned processes was slightly compressed, however, the cushioning characteristics remained thereon and there was never damage such as pits and the like on its surface.

Figure 13:
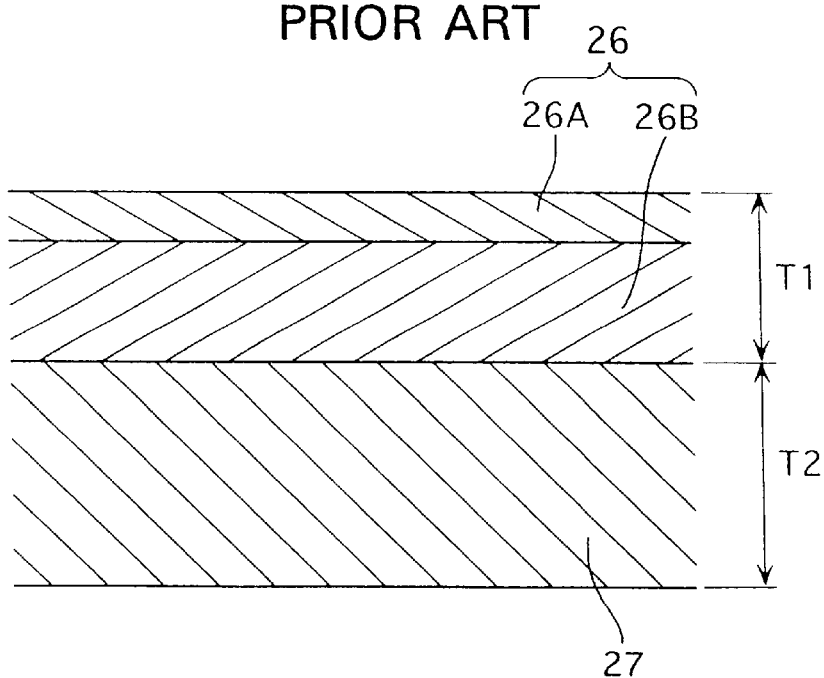
FIG. 13 is a sectional view in the comparative example 2 of the laminated molding.

On the other hand, as shown in FIG. 13, the laminated moldings by comparative example 2 resulted in the thickness T1 of the cushion face material 26 becoming much thinner than the thickness T2 of the base section 27 made from polypropylene. To be accurate, the thickness T1 was 1.7 mm and the thickness T2 of the base section 27 was 2.1 mm by means of the same measuring manner as the experimental example 2. Considering the thickness of the cushion face material 26 before starting the comparative example 2, it is confirmed that the cushion face material 26 was certainly compressed, thereby the cushioning characteristics became inferior. Consequently, satisfactory laminated moldings can not be obtained by the manner of the comparative example 2.

EXPERIMENTAL EXAMPLE 3

Figure 14:
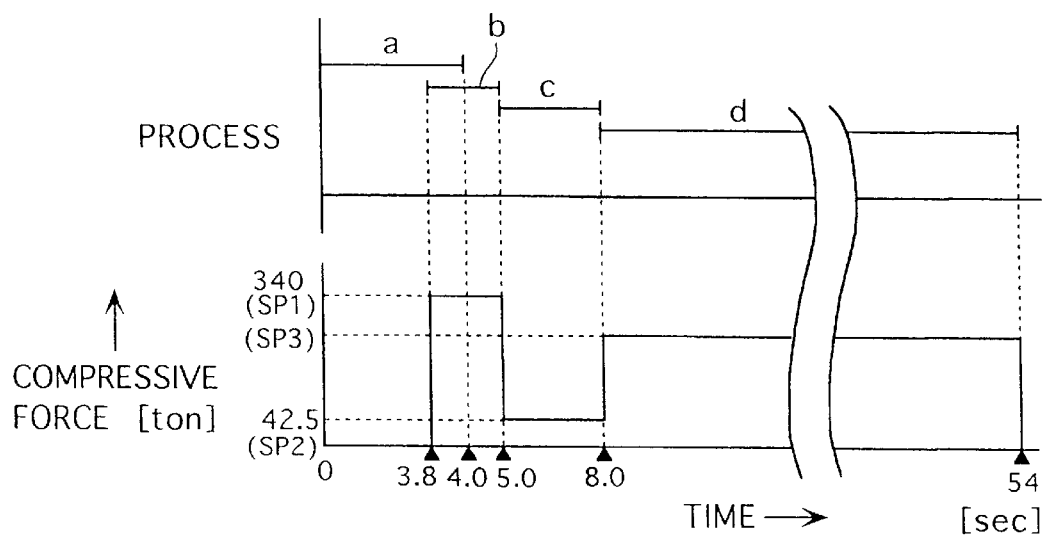
FIG. 14 is a diagram in the experimental example 3 of the compressive force during the clamping operation in accordance with the present invention.

The experimental example 3 is conducted to a door panel as a car interior member when produced under the producing method of the laminated moldings in accordance with the present invention. As shown in FIG. 14, the experimental example 3 is practiced in order of the processes a–d as the above-mentioned experimental example 2.

Following are timings of starting and completing respective processes a–d and the set points of the compressive force through respective processes b–d.

As the above-mentioned experimental example 2, the timings of respective processes a–d will be indicated with time (seconds) from when starting the filling process and the set points of the compressive force will be indicated with clamping force (tons) of the clamping apparatus.

| | |
|---|---|
| Starting time t1 of the resin spread process b | 3.8 seconds |
| Completing time t2 of the filling process a | 4.0 seconds |
| Starting (completing the resin spread process b) time t3 of the protect process c | 5.0 seconds |

-continued

| | |
|---|---|
| Starting (completing the protect process c) time t4 of the cooling process | 8.0 seconds |
| Completing time t5 of the cooling process | 54.0 seconds |
| Set point SP1 of the compressive force in the resin spread process b | 340 tons (40%) |
| Set point SP2 of the compressive force in the protect process c | 42.5 tons (5%) |
| Set point SP3 of the compressive force in the cooling process d | 204–229.5 tons (24–27%) |

COMPARATIVE EXAMPLE 3

The present comparative example 3 has been conducted under the well-known conventional technology so as to obtain the same door panel as in the afore-described experimental example 3.

Figure 15:
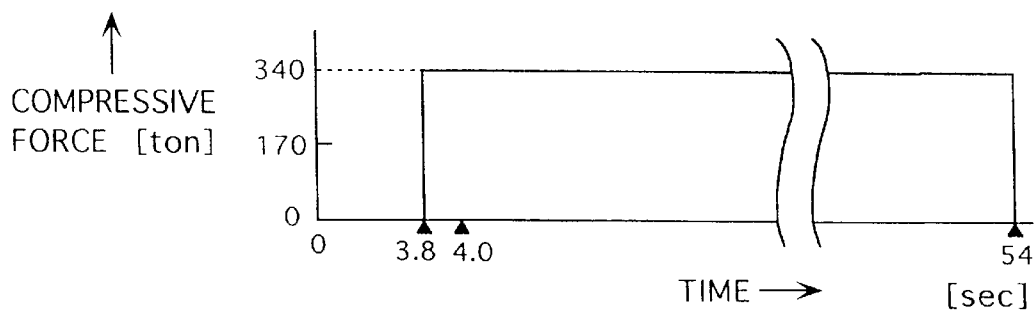
FIG. 15 is a diagram in the comparative example 3 of the compressive force during the clamping operation in accordance with the conventional prior art technology.
Figure 16:
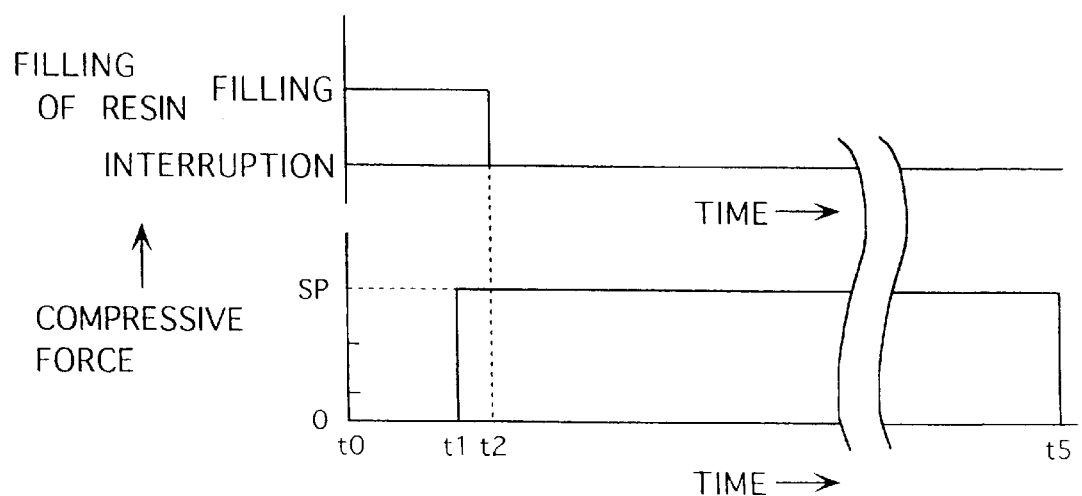
FIG. 16 is a diagram of the compressive force in the conventional, prior art technology of the clamping operation.

In the comparative example 3 as shown in FIG. 15, the mold is compressed with the same compressive force by 340 ton as in the resin spread process b of the above-mentioned experimental example 3 after 3.8 seconds from when starting filling of the molten resin. The compressive force is maintained until completing the molding operation.

COMMON INJECTION CONDITION

Both of the experimental example 3 and the comparative example 3 should be understood to be restrained to common material, apparatus and molding conditions, which are as follows:

(1) MATERIAL

As the resin utilized in the base section of the laminated moldings, polypropylene (by IDEMITSU PETROCHEMICAL CO., LTD., a brand name : IDEMITSU Polypro J-5050H, MI 55 g/10 min. : 230 C, 2.16 kgf) is employed.

The cushion face material is prepared in a single integrated sheet material having a final thickness of about 3.6 mm with the face layer having the thickness of about 0.6 mm and made from PVC and the cushion layer having the thickness of about 3.0 mm and foamed the polypropylene foamed to twenty-fold volume.

(2) MOLDING APPARATUS

The molding apparatus includes an injection compression molding machine (Screw diameter; 105 mm, Clamping force 850 tons, MITSUBISHI JUKOGYO KABUSHIKI KAISHA) being of a general horizontal injection molding machine accompanied by an injection compression molding system in the experimental example 2.

(3) MOLD

The mold includes the cavity in order to form the door panel, a height 1200 mm and a width 700 mm, and three gates provided close to the center of the cavity. A parting portion shape is made by a so called inrow system to prevent raising of a burr. The depth D of the cavity (see FIG. 8) should be 100 mm.

| (4) MOLDING CONDITION | |
|---|---|
| 1) Molding temperature | 180 C. |
| 2) Mold temperature | 40 C. |
| 3) Injection pressure of resin | 100 kg/cm$^2$ (gauge pressure) |
| 4) Compressive degree of the mold | 30 mm |
| 5) Compressive speed of the mold | 10 mm/sec. |

RESULT OF EXPERIMENTAL AND COMPARATIVE EXAMPLES

The laminated moldings obtained in the experimental example 3 were the door panels in a fine state in which there was no rift of the cushion face material and no pits were formed by melting the cushion face material.

However, the laminated moldings obtained in comparative example 3 were the door panels involving an issue in appearance and more particularly there were no cushioning characteristics and also were pits produced from melting the cushion face material at the projection (the arm rest) of the laminated moldings.

In comparative example 3, the predetermined compressive force SP1 was reduced to 255 tons in the resin spread process in order not to melt the cushion face material. The final laminated moldings did not result in the fine state because the resin was not able to be spread out at every corner in the whole cavity.

As in the forgoing description, the present invention was illustrated with the suitable embodiments. However, it should be understood that the present invention is not intended to be limited to the specific embodiments and various betterments and changes of the design are within the scope of practice of the invention without departing from the objects of the present invention.

For example, the resin resulting in the base section of the laminated moldings is not of only polypropylene excluding reinforcing fiber and the like but also polypropylene including a material to be filled thereinto, such as glass fiber, filler and the like, a general resin like polyethylene, polystyrene, ABS and the like, an engineering-plastic such as polycarbonate and the like and these fiber reinforcing resin.

The facing material can be naturally made from the fiber material sheet or the cushioning characteristics sheet, but it may be produced by an elastomer-film such as polyolefine, PVC, polyurethane and the like.

And the molding apparatus may not be used only for the injection compression molding machine but also the injection press molding machine.

The laminated molding may not be considered as being limited in application to car interior members, but also the casings for electrical appliances, the exterior decoration of furniture and the like.

Furthermore, the molding conditions for defining the above-mentioned set points of the compressive force, the time of starting and completing above-mentioned respective processes and the like, regardless of the experimental examples 2 and 3 as the forgoing described, may be determined in concrete value and numeral as occasion may demand in response to size of the produced laminated moldings and the kind of resin to be used.

According to the present invention as in the forgoing description, since the compressive force in the mold is reduced just after the resin completes spreading out into the mold, the facing material is prevented from receiving any damage and the characteristic of the facing material such as quality, nice tactile feeling, the cushioning characteristics and the like is retained. Furthermore since the mold is supplied with compressive force at enough pressure value to perform the resin spread process and the cooling process, the final laminated moldings can result in a fine quality state. The laminated moldings and the method of the present invention meet the requirements for high level quality and mass production for car interior members and also casings for electrical appliances, the exterior decoration of furniture and the like.

The embodiments of the invention in which an exclusive property or privilege is claimed are defined as follows:

1. A method of producing a laminated molding comprising the steps of:
    placing a sheet of facing material in a mold, said mold having: a secured mold section; a movable mold section, said secured and movable mold sections having opposed molding surfaces that define a mold-cavity therebetween, wherein said sheet of facing material is placed against a molding surface of at least one of said mold sections; and a clamping device for urging said movable mold section towards said secured mold section, wherein said clamping device is capable of establishing a compressive force in said cavity between said mold sections and variably adjusting the compressive force between a zero-compressive force state and a maximum-compressive force state;

performing a resin injection step wherein molten resin having no foaming agent is injected into said cavity of said mold so that said resin is located between one of said secured and movable mold sections and said sheet of facing material;

performing a resin spread step wherein said movable mold section of said mold is moved towards said secured mold section by said clamping device of said mold to establish a first compressive force against said resin to cause said resin to spread throughout said cavity of said mold and against said sheet of facing material to form a laminated molding;

performing a cooling step wherein said clamping device is adjusted to establish a second compressive force against said laminated molding that is greater than zero and less than said first compressive force to prevent bowing of the facing material, said movable mold section not retracting when the compressive force is reduced; and after cooling of said laminated molding, retracting said movable mold section of said mold from said secured mold section of said mold to enable removal of the laminated molding from said mold.

2. A method of producing a laminated molding comprising the steps of:

placing a sheet of facing material in a mold, said mold having: a secured mold section; a movable mold section, said secured and movable mold sections having opposed molding surfaces that define a mold cavity therebetween, wherein said sheet of facing material is placed against a molding surface of at least one of said mold sections; and a clamping device for urging said movable mold section towards said secured mold section, wherein said clamping device is capable of establishing a compressive force in said cavity between said mold sections and variably adjusting the compressive force between a zero-compressive force state and a maximum-compressive force state;

performing a resin injecting step wherein molten resin is injected into said cavity of said mold so that said resin is located between one of said secured and movable mold sections and said sheet of facing material;

performing a resin spread step wherein said movable mold section of said mold is moved towards said secured mold section by said clamping device of said mold to establish a first compressive force against said resin to cause said resin to spread throughout said cavity of said mold and against said sheet of facing material to form a laminated molding;

performing a two stage cooling step having a first stage occurring after said resin spread step and a second stage occurring after said first stage, wherein during said first stage of said cooling step, a second compressive force against said laminated molding that is greater than zero and less than said first compressive force is applied, said movable mold section not retracting when the compressive force is reduced and during said second stage said clamping device is adjusted to increase the compressive force of said mold so that a third compressive force greater than said second compressive force and less than said first compressive force is applied to the laminated molding, said movable mold section not moving when the compressive force is increased; and after cooling of said laminated molding, retracting said movable mold section of said mold from said secured mold section of said mold to enable removal of the laminated molding from said mold.

3. The method of producing a laminated molding of claim 2, wherein said first stage of said cooling step is initiated with a termination of said resin spread step.

4. The method of producing a laminated molding of claim 3, wherein: in said first stage of said cooling step, said clamping device maintains said second compressive force against said laminated molding at approximately 12% to 33% of said first compressive force; and in said second stage of said cooling step, said clamping device maintains said third compressive force against said laminated molding at between 60% and 67% of said first compressive force.

5. The method of producing a laminated molding of claim 3, wherein: said first stage of said cooling step lasts approximately 3.0 seconds and in said first stage, said clamping device maintains said second compressive force against said laminated molding at between 12% and 33% of said first compressive force; and in said second stage of said cooling step, said clamping device maintains said third compressive force against said laminated molding at between 60% and 67% of said first compressive force.

6. The method of producing a laminated molding of claim 1, wherein said cooling step is initiated with a termination of said resin spread step.

7. The method of producing a laminated molding of claim 6, wherein in said cooling step, said clamping device is adjusted so that said second compressive force maintained against said laminated molding is about 25% of said first compressive force.

8. The method of producing a laminated molding of claim 1, wherein said mold sections and said clamping device are part of either an injection compression molding machine or an injection press molding machine.

9. The method of producing a laminated molding of claim 1, wherein said resin spread step is initiated prior to a termination of said resin injection step.

10. The method of producing a laminated molding of claim 1, wherein said sheet of facing material comprises a multi-layered sheet having a face layer that forms an outer layer of the laminated molding and a cushion layer formed of a sheet of cushioning material having cushioning characteristics.

11. The method of producing a laminated molding according to claim 10, wherein said face layer of said sheet of material comprises a thermoplastic elastomer film.

12. The method of producing a laminated molding according to claim 11, wherein said thermoplastic elastomer film is formed from the group consisting of: polyolefin; polyurethane; and polyvinyl chloride.

13. The method of producing a laminated molding according to claim 10, wherein said cushioning layer of said sheet of facing material comprises a foam synthetic resin.

14. The method of producing a laminated molding according to claim 13, wherein said foam synthetic resin comprises polypropylene.

15. The method of producing a laminated molding of claim 1, wherein said resin is selected from the group consisting of homopolymers and copolymers of polyethylene, copolymer polypropylene, a polystyrene, acrylonitrile-butadienestyrene, a polycarbonate and polyamide.

16. The method of producing a laminated molding of claim 15, wherein said resin contains a filler.

17. The method of producing a laminated molding according to claim 1, wherein the first compressive force is reduced to establish the second compressive force after the resin injection step.

18. The method of claim 17, wherein the reduction of the first compressive force occurs about five seconds after completion of the resin injection step.

19. The method of producing a laminated molding according to claim 1, wherein the sheet of facing material is formed from a cloth.

20. The method of producing a laminated molding according to claim 19, wherein said cloth is selected from the group consisting of: woven fabric; non-woven fabric; and knitted fabric.

21. The method of producing a laminated molding according to claim 19, wherein said cloth is selected from the group consisting of: natural fiber cloth; animal fiber cloth; natural inorganic fiber cloth; chemical synthetic fiber cloth; and mixed fiber cloth.

22. The method of producing a laminated molding of claim 1, wherein said sheet of facing material comprises a multi-layer material including a cloth that functions as an outer surface of the laminated molding and a second, impregnation prevention layer that is positioned between said cloth and said molten resin to prevent said resin from contacting said cloth.

23. The method of producing a laminated molding according to claim 22, wherein said cloth is formed from woven fabric that has a first layer with a fine mesh, and a second layer with a mesh that is coarser than said mesh of said first layer and said cloth is placed in said mold so that said first layer functions as said impregnation prevention layer and said second layer functions as the outer layer of the laminated molding.

24. A method of producing a laminated molding comprising the steps of:
    placing a sheet of facing material in a mold, said mold having: a secured mold section; a movable mold section, said secured and movable mold sections having opposed molding surfaces that define a mold cavity therebetween, wherein said sheet of facing material is placed against a molding surface of at least one of said mold sections; and a clamping device for urging said movable mold section, wherein said clamping device is capable of establishing a compressive force in said cavity between said mold sections and variably adjusting the compressive force between a zero-compressive force state and a maximum-compressive force state;
    injecting molten resin free from a foaming agent into said cavity of said mold so that said resin is located between one of said secured and movable mold sections and said sheet of facing material;
    performing a resin spread step wherein said movable mold section of said mold is moved towards said secured mold section by said clamping device of said mold to establish a first compressive force against said resin to cause said resin to spread throughout said cavity of said mold and against said sheet of facing material to form a laminated molding, said first compressive force spreading the resin throughout the cavity, said first compressive force being opposed by an opposing force resisting spreading of the resin throughout the cavity and an opposing force caused by the injection of the molten resin into the mold cavity during the duration of the injection step;
    performing a cooling step, between just before complete filling of the resin in the mold and immediately after completion of filling the resin in the mold, by adjusting said clamping device to establish a second compressive force against said laminated molding that is greater than zero and less than said first compressive force, said movable mold section not retracting when the compressive force is reduced, the second compressive force being opposed by an opposing force from the resin and the facing material within the mold, the opposing force being reduced by stopping of injection of the molten resin, and compression of the facing material; and
    after cooling of said laminated molding for a predetermined time, retracting said movable mold section of said mold from said secured mold section of said mold to enable removal of the laminated molding from said mold,
    wherein a value of said second compressive force enables the sheet of facing material to substantially retain its original characteristics and to prevent bowing of the sheet of facing material.

25. The method of claim 24, wherein the reduction of the first compressive force occurs about five seconds after completion of the resin injection step.

26. The method of claim 24, wherein the facing material comprises a multi-layered sheet having a face layer that forms an outer layer of the laminated molding and a cushioning layer formed of a foam synthetic resin having cushioning characteristics.

27. The method of claim 26, wherein the first compressing force acts to spread the resin in the mold before complete filling of the mold and does not act to compress the cushioning layer significantly.

28. A method of producing a laminated molding comprising the steps of:
    providing a sheet of facing material having an impregnation protection layer and a fiber material layer;
    placing the sheet of facing material in a mold, said mold having: a secured mold section; a movable mold section, said secured and movable mold sections having opposed molding surfaces that define a mold cavity therebetween, wherein the fiber material layer of said sheet of the facing material is placed against a molding surface of at least one of said mold sections; and a clamping device for urging said movable mold section, wherein said clamping device is capable of establishing a compressive force in said cavity between said mold sections and variably adjusting the compressive force between a zero-compressive force state and a maximum-compressive force state;
    performing a resin injection step wherein molten resin free from a foaming agent is injected into said cavity of said mold so that said resin is located between one of said secured and movable mold sections and said sheet of facing material;
    performing a resin spread step before the resin injection step ends, and continuing the resin spread step after the resin is no longer being injected into said cavity, wherein in the resin spread step said movable mold section of said mold is moved towards said secured mold section by said clamping device of said mold to establish a first compressive force against said resin during movement of the movable mold section to cause said resin to spread throughout said cavity of said mold and against said sheet of facing material to form a laminated molding, said first compressive force spreading the resin into the entire mold without compressing the cushioning layer significantly;
    performing a cooling step, just before complete filling of the resin in the mold or immediately after completion of filling the resin in the mold, by adjusting said clamping device to establish a second compressive force against said laminated molding that is greater than zero and less than said first compressive force, said movable mold section not retracting when the compressive force is reduced; and after cooling of said laminated molding for a predetermined time, retracting said movable mold section of said mold from said secured mold section of said mold to enable removal of the laminated molding from said mold, whereby said second compressive force being less than the first compressive force enables the sheet of facing material to retain its original characteristics.

* * * * *